Patented Mar. 30, 1937

2,075,549

UNITED STATES PATENT OFFICE 2,075,549

ANTIOXIDANT

Waldo L. Semon, Silver Lake Village, Ohio, assignor to The B. F. Goodrich Company, New York, N. Y., a corporation of New York No Drawing. Application August 23, 1935, Serial No. 37,530

10 Claims. (Cl. 18—50)

This invention relates to the preservation of oxidizable organic substances, and particularly of rubber, and has as its object to provide a new type of antioxidants.

The antioxidants of this invention are diarylamines containing unsaturated aliphatic side chains, including such typical compounds as phenylamino styrene, propenyl diphenylamine, isopropenyl diphenylamine, allyl diphenylamine, alpha-ethyl-vinyl diphenylamine, alpha-methyl-propenyl diphenylamine, beta-methyl-propenyl diphenylamine, beta methyl allyl diphenylamine, isopropenyl-phenyl tolyl amine, isopropenyl-phenyl naphthylamine, isopropenyl-naphthyl phenyl amine, isopropenyl phenyl amino indane, isopropenyl dixenylamine, di-isopropenyl diphenylamine and the like. The unsaturated aliphatic group may occupy any position in the aromatic nucleus, but the best results are obtained with para-substituted compounds. The compounds enumerated above are all extremely effective antioxidants. They not only greatly retard deterioration, but possess the property of inhibiting the formation of flex cracks in rubber goods, such as tire treads, subjected to rapidly repeated stresses.

As a specific example of one embodiment of the invention, a tire tread composition is prepared by mixing 100 parts by weight of rubber, 45 parts of carbon black, 5 parts of zinc oxide, 2 parts of pine tar, 2 parts of stearic acid, 3.25 parts of sulphur and 0.5 part of polybutylideneaniline, along with 1 part of para-isopropenyl diphenylamine. The para-isopropenyl diphenylamine may be prepared by heating 850 parts by weight of diphenylamine under reflux for eight hours with 60 parts of acetone and 15 parts of concentrated hydrochloric acid, neutralizing and washing, adding about 5 parts of syrupy phosphoric acid and fractionally distilling in a vacuum. During the refluxing, part of the diphenylamine is converted to dianilino diphenyl 2,2 propane which is decomposed by the phosphoric acid into diphenylamine and isopropenyl diphenylamine. The greater part of the diphenylamine is therefore recovered in the distillation, followed by about 180 parts of the desired isopropenyl diphenylamine. The rubber composition containing this compound is vulcanized in a mold 45 minutes at 295° F. to give an optimum cure. The vulcanized composition deteriorates only from one-fourth to one-tenth as rapidly as the same composition without antioxidant, the exact ratio depending on the conditions to which it is subjected, and furthermore is far more resistant to flex cracking, either fresh or after aging.

The antioxidants of this invention may be employed in practically any type of rubber composition or compositions related to rubber such as gutta percha, balata, artificial rubber isomers, synthetic rubber and the like. They may be employed, not only by mechanical incorporation into the rubber, but by application to its surface, or by mixing with liquid dispersions of rubber such as latex or rubber cement, either alone or together with other antioxidants, solvents, pigments, and the like. They may likewise be used to retard the deterioration of other oxidizable organic materials, including fatty oils and especially unsaturated oils such as the drying oils, soaps, cracked gasoline and other petroleum derivatives, aldehydes, essential oils and the like by adding a suitable small proportion, say from 0.01 to 0.1% of one of these antioxidants.

The term "rubber" unless otherwise limited is employed in the appended claims to include caoutchouc, gutta percha, balata, reclaimed rubber, synthetic rubber, artificial rubber isomers, and like products, whether vulcanized or unvulcanized and whether or not admixed with other bodies such as fillers, pigments, vulcanizing and accelerating agents. The term "aryl" is employed to define a univalent aromatic hydrocarbon radical whose free valence belongs to the nucleus and not to a side chain, and the term "diarylamine" and like expressions in the claims are employed to include only secondary and not tertiary amines.

I claim:

1. The method of retarding the deterioration of an oxidizable organic material which tends to deteriorate by absorption of oxygen from the air which comprises treating it with a diarylamine in which at least one aryl group contains an unsaturated aliphatic hydrocarbon side chain.

2. The method of retarding the deterioration of rubber which comprises treating rubber with a diarylamine in which at least one aryl group contains an unsaturated aliphatic hydrocarbon side chain.

3. The method of retarding the deterioration of rubber which comprises treating rubber with a diarylamine in which at least one of the aryl groups contains an isoprophenyl substituent.

4. The method of retarding the deterioration of rubber which comprises treating rubber with a p-isopropenyl-phenyl aryl amine.

5. The method of retarding the deterioration of rubber which comprises treating rubber with p-isopropenyl diphenylamine.

6. The method of retarding the deterioration of vulcanized rubber which comprises vulcanizing rubber in the presence of p-isopropenyl diphenylamine.

7. A composition comprising an oxidizable organic material which tends to deteriorate by absorption of oxygen from the air protected against deterioration by a small proportion of a diarylamine in which at least one aryl group contains an unsaturated aliphatic hydrocarbon side chain.

8. A rubber composition comprising rubber and a diarylamine in which at least one aryl group contains an unsaturated aliphatic hydrocarbon side chain.

9. A rubber composition comprising rubber and an isopropenylphenyl aryl amine.

10. A rubber composition comprising rubber and p-isopropenyl diphenylamine.

WALDO L. SEMON.

CERTIFICATE OF CORRECTION.

Patent No. 2,075,549.  March 30, 1937.

WALDO L. SEMON.

It is hereby certified that error appears in the printed specification of the above numbered patent requiring correction as follows: Page 1, second column, line 50, claim 3, for "isoprophenyl" read isopropenyl; and that the said Letters Patent should be read with this correction therein that the same may conform to the record of the case in the Patent Office.

Signed and sealed this 16th day of November, A. D. 1937.

(Seal)

Henry Van Arsdale,
Acting Commissioner of Patents.